June 23, 1931.   C. D. MASON   1,811,513
FOAM DESTROYER
Filed Sept. 8, 1930
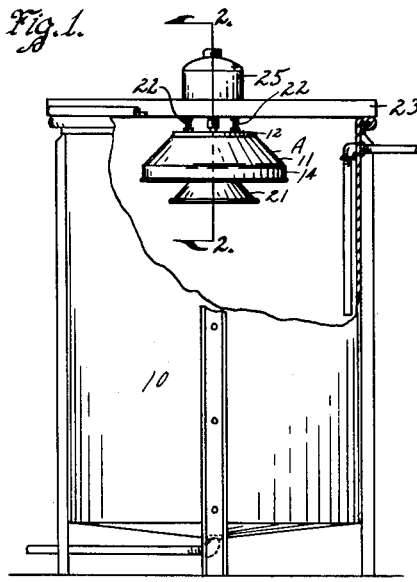
Witness
H. S. Menzenmaier
Inventor
Charles Dorel Mason
by Bair, Freeman & Sinclair
Attorneys Patented June 23, 1931

1,811,513

UNITED STATES PATENT OFFICE

CHARLES DOREL MASON, OF DES MOINES, IOWA

FOAM DESTROYER

Application filed September 8, 1930. Serial No. 480,469.

The object of my present invention is to provide a very simple, economical and efficient foam destroyer.

Where milk is put through a separator in a creamery and delivered from the separator to a milk tank, a great deal of foam is created and it becomes necessary to provide some means for reducing this foam.

I have in my present invention produced such a foam destroyer having a minimum number of parts and a minimum simplicity of construction, thereby reducing the cost of the foam destroyer to a very low point.

A further object is to provide such a foam destroyer which can be manufactured conveniently and easily and mounted in the top of any milk tank.

More particularly, it is my object to provide a foam destroyer comprising a hoodlike structure open at its lower end and having a top and flaring sides with a fan supported therein adjacent to the top, a plate supported below the fan, a somewhat bell-shaped member through which foam is drawn to the fan, and a motor suitably arranged for operating the fan and adapted to operate it at high speed.

Still a further object is to provide a fan of a shape peculiarly adapted for its purpose.

This application is a continuation in part of my previous application, Serial No. 364,503, filed March 30, 1929.

With these and other objects in view, my invention consists in the construction, arrangement and combination of the various parts of my foam destroyer and method of destroying foam, whereby the objects contemplated are attained, as hereinafter more fully set forth, pointed out in my claims, and illustrated in the accompanying drawings, in which:

Figure 1 is a side elevation of a milk tank equipped with a foam destroyer embodying my invention, parts of the tank being broken away and parts being shown in section.

Figure 2 is a vertical, sectional view through the foam destroyer taken on the line 2—2 of Figure 1; and Figure 3 is a detail, sectional view taken on the line 3—3 of Figure 2.

In the accompanying drawings, I have used the reference numeral 10 to indicate generally one of the large milk tanks used for receiving milk from a separator. With the milk coming from the separator, there is a large amount of foam, which must be reduced.

In the drawings, I have shown my improved foam reducer as comprising the hood-shaped structure A, consisting of the flaring wall member 11 with the vertical, cylindrical portion 12 at its upper end, terminating in an in-turned annular flange 13. At the bottom of the flaring wall portion 11 is a vertical walled cylindrical portion 14.

Sweated into the inside of the member A at the top is a casting comprising disc-like plate 15 with spaced downwardly extending posts 16. The disc casting 15 is sweated into the upper part of the hood A in order to make a tight joint to gather no milk, and so that it will therefore be sanitary.

An annular plate-like ring 17 is provided with holes 18a to receive thumb screws 19a, which are screwed into the lower ends of the post 16, as shown in Figure 2. The plate-like annular ring 17 has a central opening 18 and a down-turned flange 19 around which the upper end of a tubular portion 20 of a flaring foam intake 21 is sweated. Mounted in the member 15 which forms the top of the hood are suitable upright posts 22.

I provide cross supports 23 spaced from each other and made of angle bars. The upper ends of the posts 22 are threaded and extended through holes in the angle bars 23 and have the nuts 24 above and below the horizontal flanges of these bars. A motor 25 is bolted to the angle cross supports 23 as shown. The motor shaft 26 extends downwardly and is connected with an operating shaft 28, non-rotatably mounted in a sleeve 29 formed at the center of a fan B.

The fan B comprises at its upper portion an annular disc 30 below which are the blades 31, extending substantially radially from the sleeve 29. These blades are curved forwardly as at 32 at their outer ends.

The lower parts of the blades at their central portions are cut away as at 33 to allow more room for the entrance of foam.

In installing the foam destroyer on the tank, the cross bars 23 are suitably supported on the tank wall with the hood and fan and flaring foam intake 21 projected into the tank substantially as shown in Figure 1.

In the practical operation, the motor is started and the fan is operated at approximately 3200 revolutions per minute. This is a very high speed and tends to create a strong suction upwardly through the foam intake 21. The foam is taken up by the fan blades 33 and thrown outwardly with great rapidity.

The air is thus beaten out of it and the milk is thrown against the inner surface of the flaring wall of the hood 11 and flows down into the milk into the tank. There is, of course, ample room for the air to escape.

It will be seen from the foregoing that I have provided a foam destroyer of extremely, simple and economical construction. The parts are easy to make and can be conveniently and easily assembled.

A destroyer of this kind can be installed on practically any tank at a very reasonable expense.

The parts are few and they involve relatively low cost of manufacture.

By running a fan at the high speed above indicated, I have found that with this very simple construction, the foam can be efficiently and properly destroyed as rapidly as it rises in the milk tank. Strong suction is created upwardly through the foam inlet 21 so that there is no danger of foam flowing over the top of the tank.

It will be noted that by mounting the hood on the supporting bars 23 by means of the threaded post 22 and the nuts 24, I have provided means for adjustment for conveniently connecting the shafts 26 and 28 and for taking up any slack. It should perhaps be stated that the shaft 26 is received in a socket 28a of the shaft 28 and may be locked thereto by means of a pin 28b, so that by the removal of the pin, the motor can be disconnected from the fan, so that the motor may be removed if desired.

It is also obvious that by disconnecting the motor shaft and taking off the upper nuts 24, the fan and hood may be taken off the supporting bars for purposes of cleaning, repair or replacement.

It will be seen that I have also claimed a method for destroying foam, comprising the drawing of the foam from below into a fan casing and subjecting it to the action of the fan rotating with great rapidity, throwing the milk against the inclined wall of a hood which receives the fan.

It will, of course, be understood that changes may be made in the details of the construction and arrangement of my improved foam destroyer and that any material suitable for the purpose may be employed, and it is my intention to cover by my claims any modifications in the structure or arrangement of the parts by the use of materials, which may be reasonably included within the scope of my invention:

I claim as my invention:

1. A foam destroyer, means for supporting the foam destroyer in the top of a milk tank, said foam destroyer comprising a hoodlike structure having a top and side walls extending downwardly therefrom for discharge into the tank, a fan arranged immediately below the top, an annular plate below the fan, said plate and top forming casing elements for the fan, a foam intake with a flaring lower end extending downwardly from the opening in the plate into the tank, a motor mounted on said first means, and means for operatively connecting the motor shaft with said fan.

2. In a foam destroyer, a hoodlike structure having a top and a downwardly extending wall, an annular plate supported below said top, a foam intake member extending downwardly from the opening in the plate, a fan arranged between said top and plate having a disc-like top and substantially radial blades below the top.

3. In a foam destroyer, a hoodlike structure having a top and a downwardly extending wall, an annular plate supported below said top, a foam intake member extending downwardly from the opening in the plate, a fan arranged between said top and plate having a disc-like top and substantially radial blades below the top, with their outer ends curved forwardly and their central portions cut away substantially as shown to facilitate the entrance of foam through the space between the blades.

4. In a foam destroyer, a hook-like member having a top, an annular plate supported below the top, a foam intake member extending downwardly from the opening in the plate, a fan arranged between said top and plate, rigid supporting members above the hood, posts extending upwardly from the hood and connected with said supporting members, a motor mounted on said supporting members, and means for operatively connecting the motor shaft with said fan.

5. In a foam destroyer, a hoodlike structure having a flaring wall with a short, cylindrical upward extension having an inwardly projecting annular flange and having at its lower end a down-turned cylindrical extension, a disc-like plate fitted into the interior of the upper end of said hood provided with downwardly extending posts, an annular plate detachably mounted on said posts, an annular flange extending downwardly therefrom, a foam intake member comprising an upper cylindrical portion fixed to said flange, and a lower flaring portion, posts extending upwardly from said disc-like plate, supports with which said posts are detachably connected, a motor on said supports, a fan arranged between said plates, and means for operatively connecting the shaft of the motor with said fan.

6. A foam destroyer, adapted to be supported at the top of a vat, comprising a hood-like structure having a top and side walls extending downwardly therefrom for discharging into the vat, a fan arranged immediately below the top, an annular plate below the fan, the top and plate forming casing elements for the fan, the plate having a central opening, and an intake spout extending downwardly from the opening and adapted to project into the vat.

Des Moines, Iowa, July 11, 1930.

CHARLES DOREL MASON.